Figure 3:
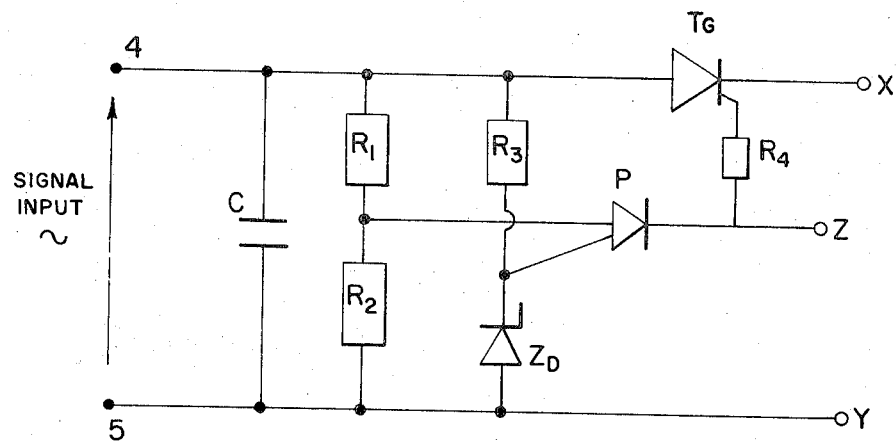

United States Patent [19]
Neasham et al.

[11] 3,821,633
[45] June 28, 1974

[54] DYNAMO-ELECTRIC MACHINES

[75] Inventors: David Lynn Neasham; William Frederick Wright, both of Newcastle upon Tyne, England

[73] Assignee: Reyrolle Parsons Limited, Durham, England

[22] Filed: Oct. 25, 1972

[21] Appl. No.: 300,646

[30] Foreign Application Priority Data
Oct. 25, 1971 Great Britain .................... 49554/71

[52] U.S. Cl. ...................................... 322/73, 322/79
[51] Int. Cl. ............................................ H02p 9/30
[58] Field of Search .......... 318/193; 322/29, 32, 17, 322/28, 73, 79

[56] References Cited
UNITED STATES PATENTS
3,378,757  4/1968  Potter ................................. 322/32
3,401,328  9/1968  Hartung .............................. 322/28
3,483,463  12/1969  Smith................................... 322/29

Primary Examiner—James D. Trammell
Attorney, Agent, or Firm—Larson, Taylor & Hinds

[57] ABSTRACT

A direct current excitation system for a rotating winding of a dynamo-electric machine, for example the field winding of a turbogenerator, employs a rotating rectifier bridge arrangement in which semi-conductor controlled rectifiers are provided together with firing initiation means for the rectifiers, the system enabling reliable firing control of the rectifiers to be simply achieved without the need for transfer of firing pulses from static to rotating machine elements.

11 Claims, 4 Drawing Figures

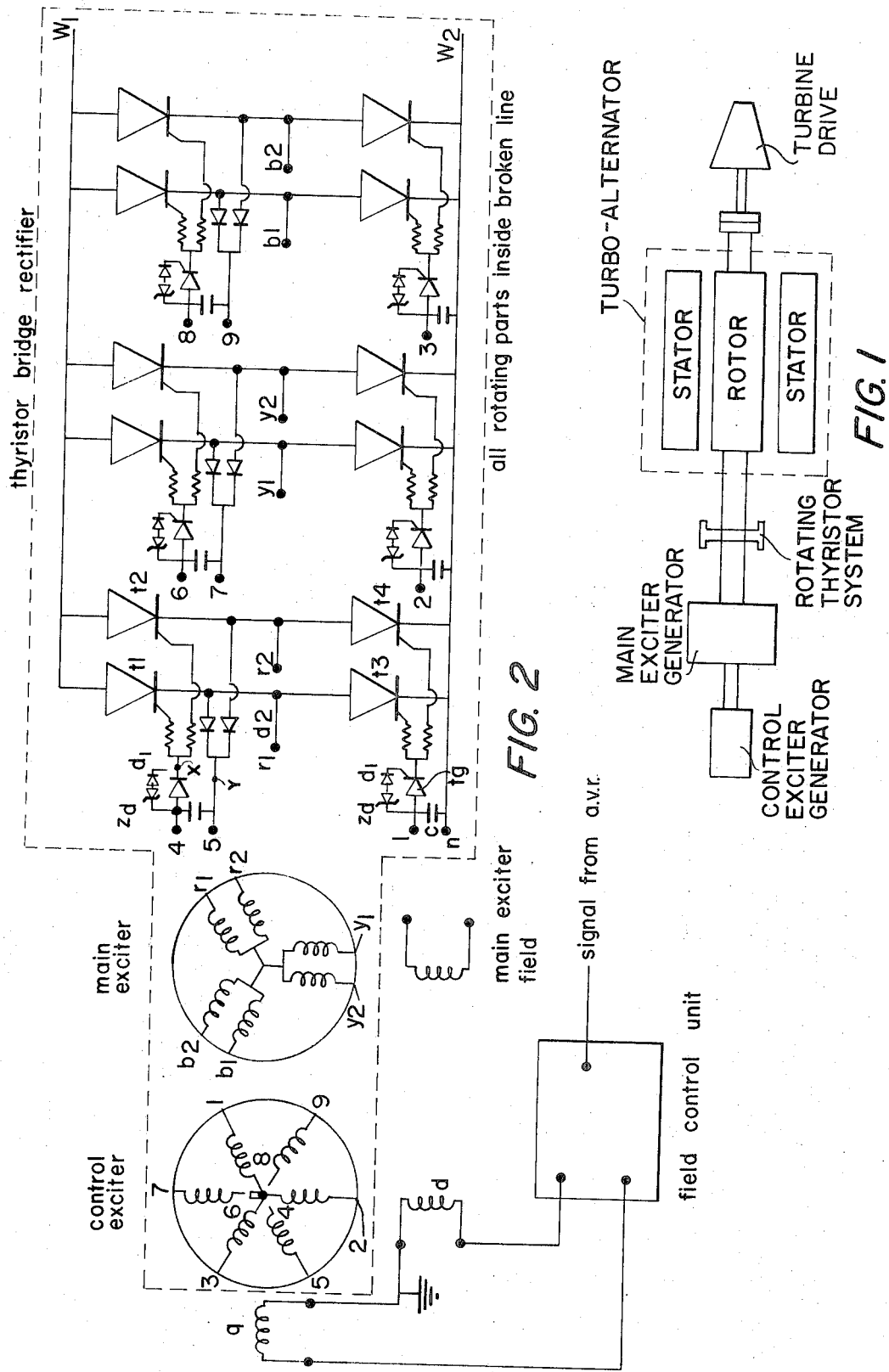

DYNAMO-ELECTRIC MACHINES

This invention relates to rotating field winding excitation systems for alternating current machines of the turbogenerator type.

Developments in the field of semi-conductor rectifying devices in recent years have led to the adoption of rotating rectifier systems in direct current excitation arrangements for rotating field windings of alternating current machines, for example, of the turbogenerator type. Excitation arrangements of this type employing thyristors have been designed whereby the d.c. excitation voltage of an alternating current generator can be varied by controlling the initiation of firing of the thyristors. The provision of satisfactory arrangements for controlling initiation of firing of the thyristors hitherto, however, has proved difficult.

The general object of the instant invention is to provide improved arrangements for alleviating such difficulties.

In accordance with the invention, a direct current excitation system for a rotating winding of a dynamo-electric machine comprises a polyphase alternating current main exciter the rotor of which is mounted on a common shaft which also carries the said rotating winding, a polyphase semi-conductor controlled rectifier full-wave rectifying bridge network also mounted on the shaft for supplying direct current to the rotating winding from the alternating current generated by the main exciter, a polyphase control exciter also having its rotor mounted on the common shaft and providing a controllable source of firing power to the gates of a plurality of semi-conductor controlled rectifiers in the rectifying bridge network, the control exciter being provided with a spatially rotatable field system displacement of which varies the phase relationship between the main and control exciter voltage outputs and effects control of the initiation of firing of the semi-conductor controlled rectifiers, and a stationary field control unit for effecting and controlling the displacement of the spatially rotatable field system in response to an excitation control signal.

The spatially rotatable field system of the control exciter may comprise two stator windings separated by 90 electrical degrees the excitation of which may be varied by the stationary field control unit to effect spatial rotation of the resultant field produced by the two stator windings.

The rectifier bridge network may be provided with two bridge branches per phase of the polyphase main exciter, each bridge branch comprising at least two principal semi-conductor controlled rectifiers arranged to share substantially equally the direct current flowing in that bridge branch when the rectifier bridge is in operation.

The polyphase armature winding of the main exciter may be provided with at least two parallel paths per phase, and each bridge branch of the rectifier bridge network may be provided with a number of principal semi-conductor controlled rectifiers equal to the number of parallel paths per phase of the main exciter armature winding, whereby each principal semi-conductor controlled rectifier is provided with an independent voltage supply.

The number of phase windings of the armature winding of the polyphase control exciter may be equal to the number of bridge branches of the rectifier bridge network.

Each phase winding of the armature winding of the polyphase control exciter may be composed of a number of sub-windings, there being an equal number of principal semi-conductor controlled rectifiers in each bridge branch of the rectifier bridge network.

Each bridge branch of the rectifier bridge network may be provided with one or more principal semi-conductor controlled rectifiers, a firing circuit for firing at least one principal semi-conductor controlled rectifier in a branch being included in each bridge branch circuit which firing circuit effects firing by way of a pilot semi-conductor controlled rectifier incorporated in the firing circuit, the pilot controlled rectifier having associated therewith in the firing circuit a capacitor adapted to supply a fast rising gate current to the principal controlled rectifier or rectifiers when the pilot controlled rectifier is fired.

Further in accordance with the invention, direct current excitation system for a rotating winding of a dynamo-electric machine comprising a polyphase alternating current main exciter the rotor of which is mounted on a common shaft which also carries the said rotating winding, a polyphase semi-conductor controlled rectifier full-wave rectifying bridge network also mounted on the shaft for supplying direct current to the rotating winding from the alternating current generated by the main exciter, a polyphase control exciter also having its rotor mounted on the common shaft and providing a controllable source of firing power to the gates of a plurality of semi-conductor controlled rectifiers in the rectifying bridge network, the control exciter being provided with a spatially rotatable field system displacement of which varies the phase relationship between the main and control exciter voltage outputs and effects control of the initiation of firing of the semi-conductor controlled rectifiers, and a stationary field control unit for effecting and controlling the displacement of the spatially rotatable field system in response to an excitation control signal, in which system each bridge branch of the rectifier bridge network is provided with two or more principal semi-conductor controlled rectifiers and further includes two or more firing circuits for the principal semi-conductor controlled rectifiers, the number of principal semi-conductor controlled rectifiers in each bridge branch being equal to or greater than the number of firing circuits in the bridge branch, and each firing circuit effecting firing of at least one principal semi-conductor controlled rectifier in the bridge branch by way of a pilot semi-conductor controlled rectifier incorporated in the firing circuit, the pilot controlled rectifier having associated therewith in the firing circuit a capacitor adapted to supply a fast rising gate current to the principal controlled rectifier or rectifiers when the pilot controlled rectifier is fired.

In a direct current excitation system as described in the preceding paragraph each firing circuit may be further provided with a programmable unijunction transistor supplying the gate of the pilot controlled rectifier and arranged to facilitate setting of the firing point of each firing circuit of a bridge branch in conformity with the or each remaining firing circuit of the branch due to its provision of a hard triggering pulse to the gate of the pilot controlled rectifier when the firing circuit operates.

The invention also consists in a direct current excitation system according to the second-from-last preceding paragraph in which each firing circuit is further provided with a programmable unijunction transistor supplying the gate of the pilot controlled rectifier and each firing circuit has an electrical connection between it and the or each remaining firing circuit in the branch, the electrical connections interconnecting the cathodes of the programmable unijunction transistors in the firing circuits of the branch.

Figure 4:
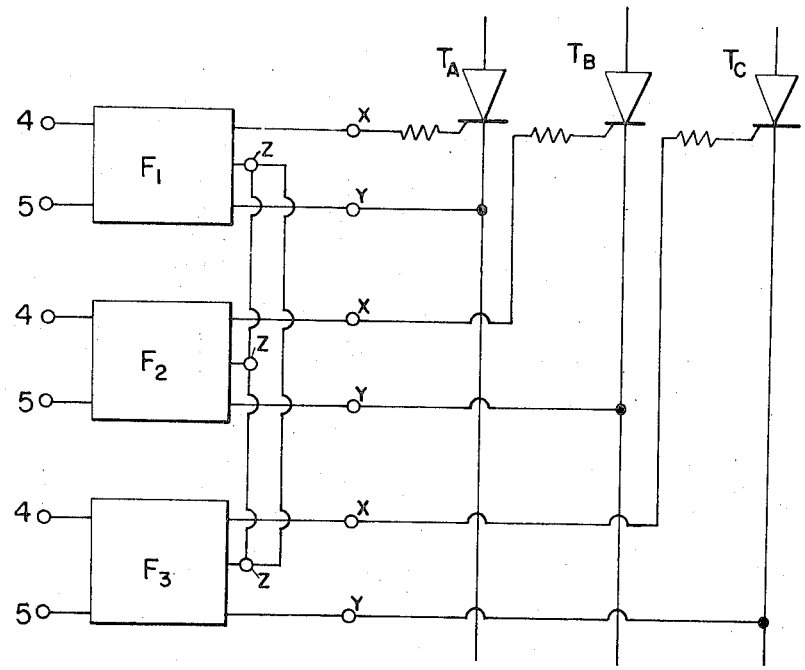

The invention will now be described with reference to the accompanying drawings, in which:

FIG. 1 shows the general layout in components for a turbo-generator having an excitation system according to the present invention, FIG. 2 shows a circuit diagram of a preferred form of direct current excitation system in accordance with the invention for the turbo-generator shown in FIG. 1, FIG. 3 shows the circuit diagram of an alternative form of firing circuit in accordance with the invention for semi-conductor controlled rectifiers in the circuit shown in FIG. 2, and FIG. 4 shows a circuit diagram of an arrangement using intercoupled firing circuits for an excitation system of the type shown in FIG. 2.

Referring first to FIG. 1, the turbogenerator shown is provided with a stator carrying a polyphase alternating current armature winding and a rotor carrying a direct current field winding. Excitation for the field winding is provided by a main exciter generator by way of a rotating thyristor (semi-controlled rectifier) system, under the control of a control exciter generator. The rotating thyristor system, main and control exciter generators are all mounted for rotation with the shaft of the turbogenerator. The turbogenerator may be driven by a turbine drive at the remote end of its rotor to the excitation system, as shown.

Whilst in the turbogenerator the armature winding is stationary and the field winding rotates, the reverse is the case for both the main exciter and control exciter. Thus, referring now to FIG. 2, the rotating items of the excitation system, which are indicated by a surrounding broken line, comprise a thyristor full-wave bridge rectifier, the rotating armature winding of the main exciter and the rotating armature winding of the control exciter. The main exciter field winding is stationary, as are direct and quadrature component field windings $d$ and $q$ for the control exciter.

In FIG. 2, electrical connections between the control and main exciter armature windings and the thyristor bridge network are not shown, but indicated by corresponding letters $r_1$, $r_2$, $b_1$, $b_2$, $y_1$, and $y_2$ for the main exciter and corresponding numerals 1–9 for the control exciter. In the embodiment of the invention shown, a three-phase main exciter is shown having two principal thyristors in each of six bridge branches of the rectifying bridge, but the invention is also applicable to systems having any plurality of main exciter phases and any number of principal thyristors per bridge branch.

The operation of one phase only of the excitation arrangement will now be described in order to give a clearer understanding of the invention.

Considering only the red phase, rectification of the current generated at the terminals $r_1$ and $r_2$, of parallel windings forming the red phase of the armature winding of the main exciter is effected by the principal thyristors $t_1$–$t_4$. Gate current to initiate firing of thyristors $t_1$, $t_2$ and $t_4$ is supplied from the windings 4–5 and 1-$n$ respectively.

The alternating voltage generated in winding 1-$n$ is applied across a pilot thyristor $t_g$, the gate circuit of which includes a Zener diode $Z_d$ and a diode $d_1$. When the magnitude of the voltage rises through a threshold value for Zener diode $Z_d$ and its polarity is such that diode $t_g$ is forward biased, Zener diode $Z_d$ breaks over allowing current to flow into the gate of rectifier $t_g$ and turning rectifier $t_g$ on. Current is thus allowed to flow from control exciter winding 1-$n$ into the gates of thyristors $t_3$ and $t_4$ which are thus also turned on.

Thyristors $t_1$ and $t_2$ are similarly turned on (or "fired") after an interval of time from the firing of thyristors $t_3$ and $t_4$ which corresponds to 180° (elec.) of the control exciter armature, that is to say the machine shaft, rotation, this being achieved by arranging windings 1-$n$ and 4–5 in antiphase. The yellow and blue phase thyristors are similarly turned on in the necessary sequence for the production of a full-wave rectified d.c. exciting voltage on lines $W_1$ and $W_2$ leading to the turbogenerator rotor field winding.

The gate current to thyristors $t_3$ and to $t_4$ continues to flow until thyristor $t_g$ is reverse biased by the control exciter voltage on winding 1-$n$, which results in thyristor $t_g$ returning to its blocking state. The diode $d_1$ protects against reverse current in the gates of both main and pilot thyristors $t_g$. Diodes $d_2$ provide a common return path from the cathodes of each parallel set of principal thyristors to a control exciter winding whilst maintaining the parallel phases isolated.

Capacitor C in each principal thyristor firing circuit charges up during the time thyristor $tg$ is forward biased and before it fires. Thus, when $t_g$ is turned on, capacitor C rapidly discharges into the gate of the set of parallel thyristors in the associated bridge branch. As a result, fast rising gate currents, limited only by the turn-on time of the pilot thyristor $t_g$, are ensured for the principal thyristors.

The time of firing of the principal thyristors relative to the phase of the alternating voltage applied to them, and thus the magnitude of the d.c. output voltage from the bridge, is dependent upon the phase displacement between the main exciter and control exciter voltages. Since the control exciter and main exciter are mechanically synchronised via the common shaft and the main exciter field is fixed in space, phase shifting may be accomplished by altering the position in space (rotation) of the control exciter field vector.

In accordance with the preferred form of the invention, rotation of the control exciter field vector is achieved by providing two stationary field windings $d$ and $q$ in quadrature for the control exciter. The position of the rotatable field vector may thus be controlled by varying the amounts of excitation current in the $d$ and $q$ windings. In order that a resultant control exciter field of constant magnitude (essential for satisfactory operation of the system) may be produced, a field control unit is provided to excite windings $d$ and $q$. The outputs of the field control unit are controlled by the unit in accordance with a signal input voltage applied to the unit and obtained from an automatic voltage regulator (a.v.r.) associated with the turbogenerator.

In an alternative embodiment of the invention to that hitherto described, each armature phase winding on the control exciter may be arranged to have a number of parallel windings corresponding to the number of principal thyristors arranged in parallel in a bridge branch. The gate of each principal thyristor can therefore be supplied by a separate winding on the control exciter via a separate pilot thyristor-capacitor circuit.

FIG. 3 shows an alternative form of firing circuit for the principal thyristors to those shown in FIG. 2. The input terminals to the firing circuit are designated 4, 5 and the output terminals X, Y, to correspond with the firing circuit for the upper left rectifier bridge branch in FIG. 2.

The arrangement of FIG. 3 provides a programmable uni-junction transistor P for triggering the pilot thyristor $T_G$ in the firing circuit. This device exhibits a low on-state forward voltage, giving a hard triggering pulse to thyristor $T_G$ when the firing voltage is reached. The gate of transistor P is held at a constant reference voltage by the Zener diode $Z_D$, whilst its anode is fed from the potential divider comprising resistors $R_1$, $R_2$. The arrangement enables firing at a prescribed level of input voltage to be achieved with less difficulty than with the arrangement shown in FIG. 2, the latter arrangement being more dependent on the tolerance of the Zener diode $Z_d$.

FIG. 4 shows an arrangement where three principal thyristors A, B and C in a bridge branch are each provided with a separate firing circuit $F_1$, $F_2$ and $F_3$, of the type shown in FIG. 3. In this arrangement the cathode of each device P in the three firing circuits is connected to the corresponding cathodes of the devices P in the remaining two firing circuits.

It may be noted that the thyristor firing arrangements according to the present invention provide for each firing circuit a firing pulse which extends over 60° (elec.) of the main exciter voltage, allowing simultaneous pulses to two branches of the bridge circuit (necessary in rectifier bridges of this type) to be provided, without additional circuitry being required to give such simultaneous pulses as is the case with known firing systems.

What we claim is:

1. A direct current excitation system for a rotating winding of a dynamo-electric machine comprising a polyphase alternating current main exciter the rotor of which is mounted on a common shaft which also carries the said rotating winding, a polyphase semi-conductor controlled rectifier full-wave rectifying bridge network also mounted on the shaft for supplying direct current to the rotating winding from the alternating current generated by the main exciter, a polyphase control exciter also having it rotor mounted on the common shaft and providing a controllable source of firing power to the gates of a plurality of semi-conductor controlled rectifiers in the rectifying bridge network, the control exciter being provided with a spatially rotatable field system displacement of which varies the phase relationship between the main and control exciter voltage outputs and effects control of the initiation of firing of the semi-conductor controlled rectifiers, and a stationary field control unit for effecting and controlling the displacement of the spatially rotatable field system in response to an excitation control signal.

2. A direct current excitation system as claimed in claim 1 in which the spatially rotatable field system of the control exciter comprises two stator windings separated by 90 electrical degrees the excitation of which may be varied by the stationary field control unit to effect spatial rotation of the resultant field produced by the two stator windings.

3. A direct current excitation system as claimed in claim 1 in which the rectifier bridge network is provided with two bridge branches per phase of the polyphase main exciter, each bridge branch comprising at least two principal semi-conductor controlled rectifiers arranged to share substantially equally the direct current flowing in that bridge branch when the rectifier bridge is in operation.

4. A direct current excitation system as claimed in claim 1 in which the polyphase armature winding of the main exciter is provided with at least two parallel paths per phase.

5. A direct current excitation system as claimed in claim 1 in which the polyphase armature winding of the main exciter is provided with at least two parallel paths per phase and each bridge branch of the rectifier bridge network is provided with a number of principal semi-conductor controlled rectifiers equal to the number of parallel paths per phase of the main exciter armature winding, whereby each principal semi-conductor controlled rectifier is provided with an independent voltage supply.

6. A direct current excitation system as claimed in claim 1 in which the number of phase windings of the armature winding of the polyphase control exciter is equal to the number of bridge branches of the rectifier bridge network.

7. A direct current excitation system as claimed in claim 1 in which each phase winding of the armature winding of the polyphase control exciter is composed of a number of sub-windings, there being an equal number of principal semi-conductor controlled rectifiers in each bridge branch of the rectifier bridge network.

8. A direct current excitation system as claimed in claim 1 in which each bridge branch of the rectifier bridge network is provided with one or more principal semi-conductor controlled rectifiers, a firing circuit for firing at least one principal semi-conductor controlled rectifier in a branch being included in each bridge branch circuit which firing circuit effects firing by way of a pilot semi-conductor controlled rectifier incorporated in the firing circuit, the pilot controlled rectifier having associated therewith in the firing circuit a capacitor adapted to supply a fast rising gate current to the principal controlled rectifier or rectifiers when the pilot controlled rectifier is fired.

9. A direct current excitation system for a rotating winding of a dynamo-electric machine comprising a polyphase alternating current main exciter the rotor of which is mounted on a common shaft which also carries the said rotating winding, a polyphase semi-conductor controlled rectifier full-wave rectifying bridge network also mounted on the shaft for supplying direct current to the rotating winding from the alternating current generated by the main exciter, a polyphase control exciter also having its rotor mounted on the common shaft and providing a controllable source of firing power to the gates of a plurality of semi-conductor controlled rectifiers in the rectifying bridge network, the control exciter being provided with a spatially rotatable field system displacement of which varies the phase relationship between the main and control exciter voltage outputs and effects control of the initiation of firing of the semi-conductor controlled rectifiers, and a stationary field control unit for effecting and controlling the displacement of the spatially rotatable field system in response to an excitation control signal, in which system each bridge branch of the rectifier bridge network is provided with two or more principal semi-conductor controlled rectifiers and further includes two or more firing circuits for the principal semi-conductor controlled rectifiers, the number of principal semi-conductor controlled rectifiers in each bridge branch being equal to or greater than the number of firing circuits in the bridge branch, and each firing circuit effecting firing of at least one principal semi-conductor controlled rectifier in the bridge branch by way of a pilot semi-conductor controlled rectifier incorporated in the firing circuit, the pilot controlled rectifier having associated therewith in the firing circuit a capacitor adapted to supply a fast rising gate current to the principal controlled rectifier or rectifiers when the pilot controlled rectifier is fired.

10. A direct current excitation system as claimed in claim 9 in which each firing circuit is further provided with a programmable unijunction transistor supplying the gate of the pilot controlled rectifier and arranged to facilitate setting of the firing point of each firing circuit of a bridge branch in conformity with the or each remaining firing circuit of the branch due to its provision of a hard triggering pulse to the gate of the pilot controlled rectifier when the firing circuit operates.

11. A direct current excitation system as claimed in claim 9 in which firing circuit is further provided with a programmable unijunction transistor supplying the gate of the pilot controlled rectifier and each firing circuit has an electrical connection between it and the or each remaining firing circuit in the branch, the electrical connections interconnecting the cathodes of the programmable unijunction transistors in the firing circuits of the branch.

* * * * *